United States Patent
Granholm

(10) Patent No.: US 10,899,291 B2
(45) Date of Patent: Jan. 26, 2021

(54) VEHICLE REAR LIFTGATE SEAL

(71) Applicant: VOLVO CAR CORPORATION, Gothenburg (SE)

(72) Inventor: Johan Granholm, Varberg (SE)

(73) Assignee: VOLVO CAR CORPORATION, Göteborg (SE)

( * ) Notice: Subject to any disclaimer, the term of this patent is extended or adjusted under 35 U.S.C. 154(b) by 87 days.

(21) Appl. No.: 16/428,230

(22) Filed: May 31, 2019

(65) Prior Publication Data

US 2020/0269669 A1 Aug. 27, 2020

Related U.S. Application Data

(60) Provisional application No. 62/810,472, filed on Feb. 26, 2019.

(51) Int. Cl.
| | |
|---|---|
| *B60R 13/06* | (2006.01) |
| *B60R 13/07* | (2006.01) |
| *B60J 5/10* | (2006.01) |
| *B60J 10/80* | (2016.01) |
| *B60J 1/00* | (2006.01) |
| *B60J 10/25* | (2016.01) |
| *B60J 7/00* | (2006.01) |
| *B60J 10/00* | (2016.01) |
| *B60J 1/18* | (2006.01) |

(52) U.S. Cl.
CPC .............. *B60R 13/06* (2013.01); *B60J 1/004* (2013.01); *B60J 5/101* (2013.01); *B60J 5/102* (2013.01); *B60J 7/0084* (2013.01); *B60J 10/25* (2016.02); *B60J 10/80* (2016.02); *B60R 13/07* (2013.01); *B60J 1/18* (2013.01); *B60J 10/45* (2016.02)

(58) Field of Classification Search
CPC ..... B60J 5/10; B60J 5/101; B60J 10/25; B60J 7/0084; B60R 13/07; B60R 13/06
USPC .............................. 296/56, 106, 146.8, 146.9
See application file for complete search history.

(56) References Cited

U.S. PATENT DOCUMENTS

| | | | |
|---|---|---|---|
| 5,209,546 A | 5/1993 | Hasegawa et al. | |
| 5,346,273 A * | 9/1994 | Takeuchi | B60J 10/24 |
| | | | 296/146.9 |
| 7,360,825 B2 | 4/2008 | Yoshioka et al. | |
| 8,123,277 B2 | 2/2012 | Aldersley et al. | |
| 8,882,186 B2 * | 11/2014 | Matsumoto | B60J 7/1642 |
| | | | 296/216.02 |
| 9,010,850 B2 | 4/2015 | Bach | |
| 2014/0203591 A1 | 7/2014 | Lathwesen | |
| 2015/0266364 A1 | 9/2015 | Im et al. | |
| 2015/0283888 A1 | 10/2015 | Togashi | |

(Continued)

FOREIGN PATENT DOCUMENTS

| | | | | |
|---|---|---|---|---|
| DE | 4302547 A1 * | 3/1994 | ........... | B62D 35/007 |
| DE | 10103762 A1 * | 8/2002 | .............. | B60J 10/86 |

*Primary Examiner* — Dennis H Pedder
(74) *Attorney, Agent, or Firm* — Berenato & White, LLC

(57) ABSTRACT

A liftgate seal is disclosed for a vehicle including a vehicle roof and a vehicle liftgate having a liftgate window pane, the liftgate seal includes a base wall, adapted to be secured to an interior surface of the window pane, and a channel structure including a first wall connected to the base wall and a second wall angled relative to the first wall. The second wall includes a distal end adapted to contact a rear edge of the vehicle roof when the vehicle liftgate is closed position thereby sealing a gap between the rear edge of the vehicle roof and the liftgate window pane.

20 Claims, 6 Drawing Sheets

(56) References Cited

U.S. PATENT DOCUMENTS

2016/0059684 A1 3/2016 Nam
2018/0326830 A1 11/2018 Farmer et al.

* cited by examiner

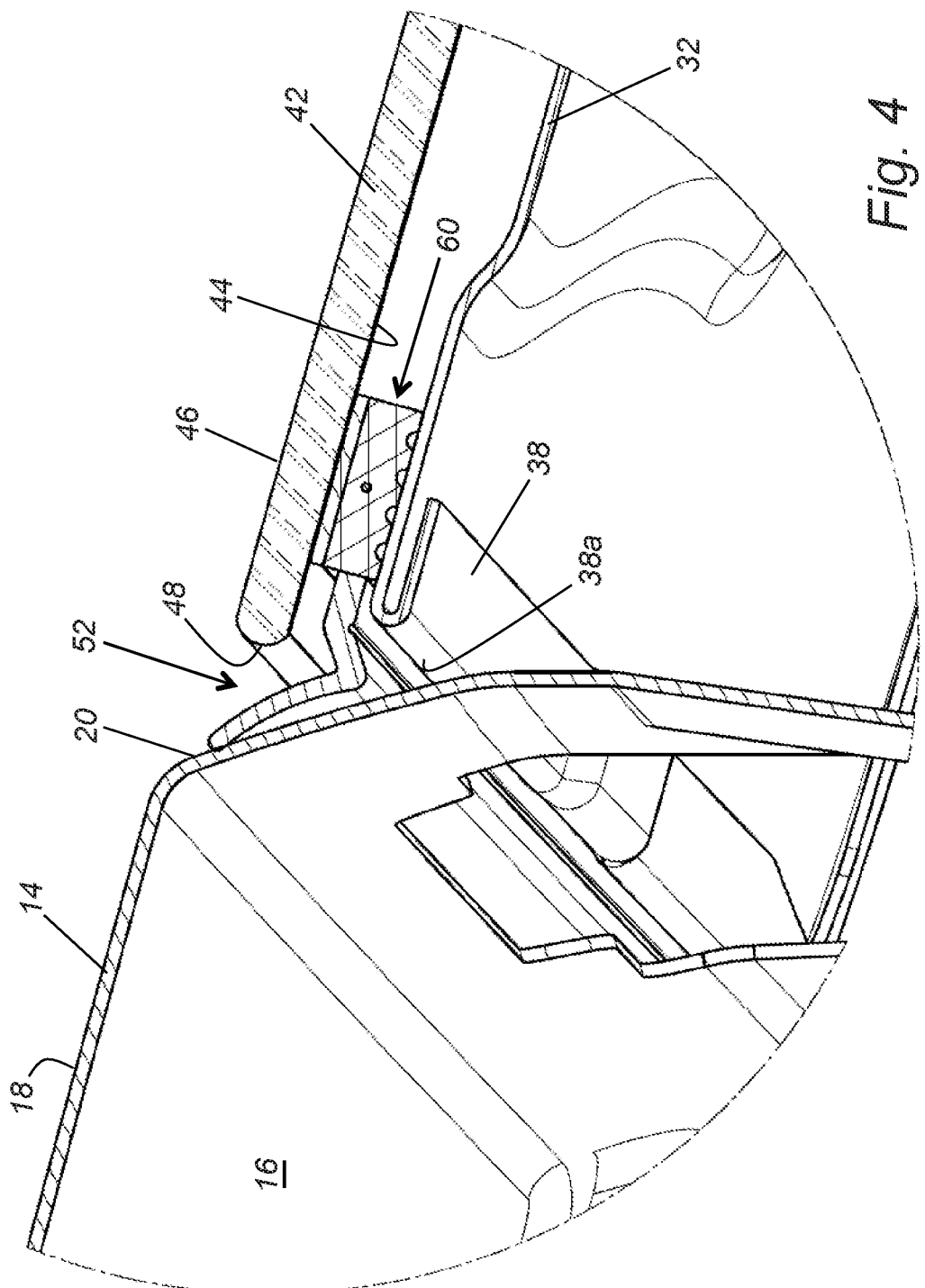

VEHICLE REAR LIFTGATE SEAL

CLAIM TO PRIORITY

This application claims the priority of U.S. Provisional Patent Application No. 62/810,472, filed Feb. 26, 2019, which is incorporated herein by reference.

TECHNICAL FIELD

The present invention relates to a vehicle rear liftgate seal, particularly a vehicle rear liftgate seal that maintains contact with a rear edge of a vehicle roof when the rear liftgate is in a lowered/closed position. The present invention also relates to a vehicle having such a vehicle rear liftgate seal.

BACKGROUND ART

Motor vehicles for land use include sedans, coupes, sports utility vehicles (also known as SUVs), and hatchbacks. Sedans and coupes typically have four side doors and two side doors, respectively, and a rear trunk that is pivotally movable between open and closed positions to access and lock a trunk storage area. A partition or the rear seats of sedans and coupes serve to separate the trunk storage area from the interior passenger compartment.

SUVs and hatchbacks typically include two or four side doors and a rear liftgate (or hatch) door pivotally movable between open and closed positions to access and lock a rear cargo compartment, which usually is accessible from the interior passenger compartment. The liftgate often includes a rear window pane circumscribed by a frame part of the liftgate. The frame part typically includes an upper frame member that abuts the roof of the vehicle when the liftgate is in its closed position.

There has been a trend towards equipping sedans and coupes with rear liftgates having rear window panes that are flush with and adjacent to the roof section of the vehicle. That is, the edge of the rear window pane faces the rear edge of the roof, without a door frame cross-member therebetween. This pane-to-roof interface can leave a gap that creates wind noise when the vehicle travels at high rates of speed. The gap can also become packed with snow and ice, especially during the winter.

SUMMARY

A first aspect of the invention is directed to a liftgate seal for a vehicle including a vehicle roof and a vehicle liftgate having a liftgate window pane, the liftgate seal comprising a base wall secured to an interior facing surface of the liftgate window pane, and a channel structure including a first wall connected to the base wall and a second wall angled relative to the first wall. The second wall has a distal end in contact with a rear edge of the vehicle roof when the vehicle liftgate is in the closed position thereby sealing a gap between the rear edge of the vehicle roof and the liftgate window pane.

A second aspect of the invention provides a liftgate seal for a vehicle including a vehicle roof and a vehicle liftgate having a liftgate window pane, the liftgate seal comprising a base wall configured to be secured to an interior facing surface of the liftgate window pane, and a channel structure including a first wall connected to the base wall and a second wall angled relative to the first wall. The second wall has a distal end configured to be in contact with a rear edge of the vehicle roof when the vehicle liftgate is in the closed position, thereby sealing a gap between the rear edge of the vehicle roof and the liftgate window pane. The channel structure has a lower density than the base wall.

According to a third aspect of the invention, a vehicle is provided that includes a vehicle roof, a vehicle liftgate having a liftgate window pane, and a liftgate seal of the first or second aspect of the invention.

According to an embodiment of any of the above aspects, the liftgate window pane has an exterior window surface and the vehicle roof has an exterior roof surface that are substantially flush with one another with the gap therebetween when the vehicle liftgate is in the closed position, and wherein the second wall extends into the gap.

According to another embodiment of any of the above aspects, the base wall of the liftgate seal includes an upper surface adhesively secured (or adhesively securable) to the interior facing surface of the liftgate window pane and an opposite lower surface. Further, optionally, the opposite lower surface abuts (or is configured to abut) against a forward frame member of the vehicle liftgate.

According to still another embodiment of any of the above aspects, the vehicle liftgate seal is the only structure between a forward edge of the liftgate window pane and the rear edge of the vehicle roof when the vehicle liftgate is in the closed position.

According to a further embodiment of any of the above aspects, the vehicle liftgate seal comprises an elastomer. The elastomer may be, for example, an ethylene-propylene-diene-monomer (EPDM) polymer. Optionally, the base wall is made of a first elastomer (e.g., EPDM polymer) and the first and second angled walls of the channel structure are made of a second elastomer (e.g., EPDM polymer), and the first elastomer has a higher density than the second elastomer.

According to a still further embodiment of any of the above aspects, the first and second walls of the channel structure collectively define a V-shape.

According to a yet further embodiment of any of the above aspects, a stem portion connects the base wall to the channel structure.

According to another embodiment of any of the above aspects, the first and second walls collectively define a channel configured to receive rainwater falling from the liftgate window pane when the vehicle liftgate is in a raised position.

The above aspects and embodiments may be combined and practiced with one another in any combination, including in combination with further exemplary embodiments described below and illustrated in the drawings.

Other aspects and embodiments of the invention, including seals, vehicles, structures, components, assemblies, apparatus, kits, methods and processes of making and using, and the like which constitute part of the invention, will become more apparent upon reading the following detailed description of the exemplary embodiments.

BRIEF DESCRIPTION OF THE DRAWINGS

The accompanying drawings are incorporated in and constitute a part of the specification. The drawings, together with the general description given above and the detailed description of the exemplary embodiments and methods given below, serve to explain principles of the invention. In such drawings:

FIG. 4 is a fragmented cutaway view of the vehicle of FIG. 1 depicting the rear liftgate body and the rear window pane in the lowered or closed position;

DESCRIPTION OF EMBODIMENTS

Figure 1:
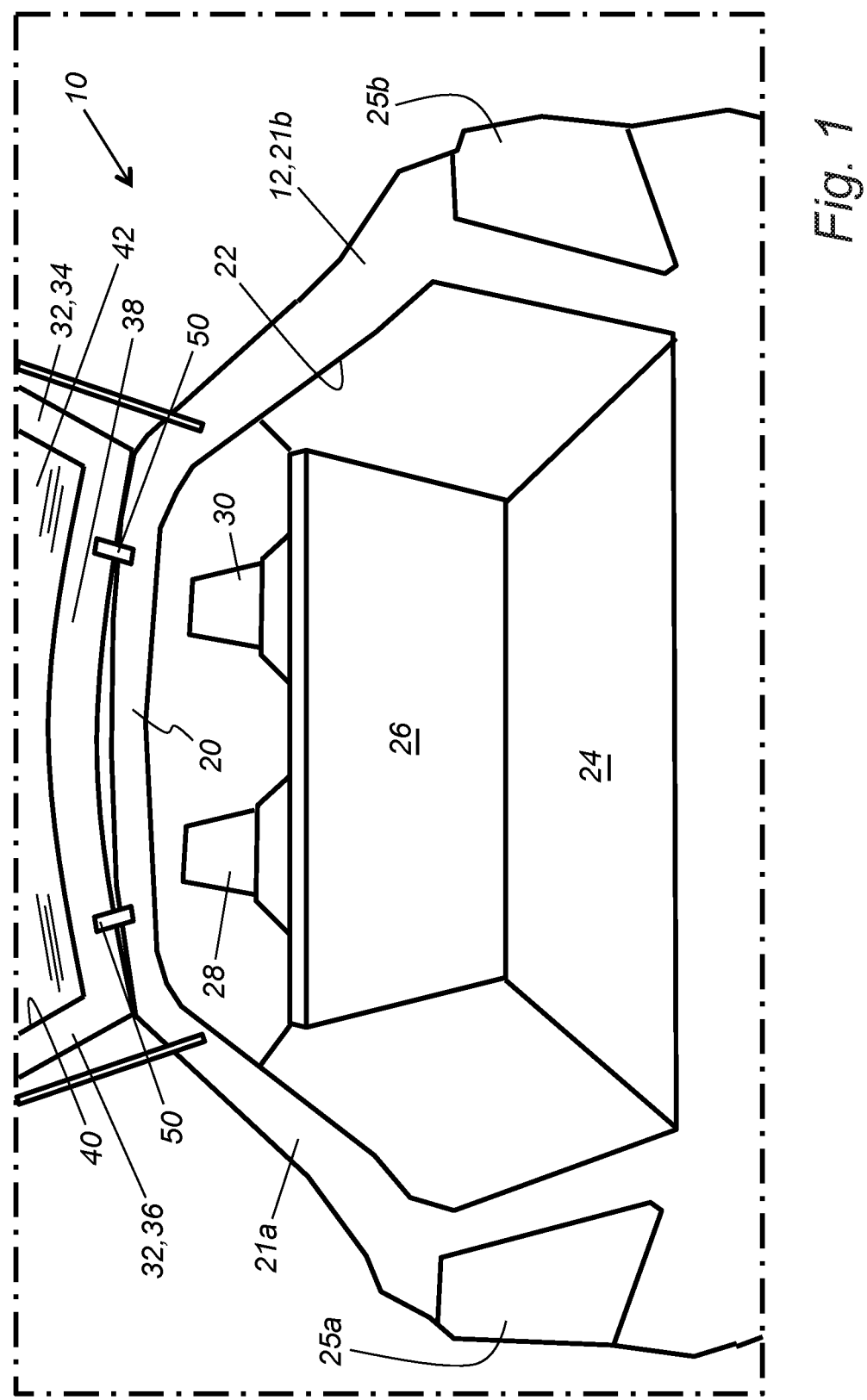
FIG. 1 is a rear view of a vehicle according to an exemplary embodiment of the invention having a rear liftgate body and rear window pane depicted in a raised or open position.

Reference will now be made in detail to the exemplary embodiments and exemplary methods as illustrated in the accompanying drawings, in which like reference characters designate like or corresponding parts throughout the drawings. It should be noted, however, that the invention in its broader aspects is not necessarily limited to the specific details, representative materials and methods, and illustrative examples shown and described in connection with the exemplary embodiments and exemplary methods.

A vehicle according to an exemplary embodiment of the invention is generally designated by reference numeral 10 in FIG. 1. The vehicle 10 includes a vehicle body 12. In the exemplary embodiment depicted in the drawings, the vehicle body 12 is shaped as a sedan. It should be understood that the principles and features of the present invention may be applied to other vehicle body types, including coupes, sport utility vehicles (SUVs), hatchbacks, and crossovers. The principles of the present invention are applicable to gas-driven vehicles, electric-powered vehicles, hybrids, and other types of powered vehicles.

As best shown in FIGS. 1-5, the vehicle body 12 includes a roof section (or vehicle roof) 14 having an interior facing roof surface 16, an exterior facing roof surface 18 opposite to the interior facing roof surface 16, and a rear edge 20 extending downward from the exterior facing roof surface 18. The interior facing roof surface 16 faces the interior passenger compartment of the vehicle 10, and may include a liner or other decorative material for forming the ceiling of the interior passenger compartment.

Figure 3:
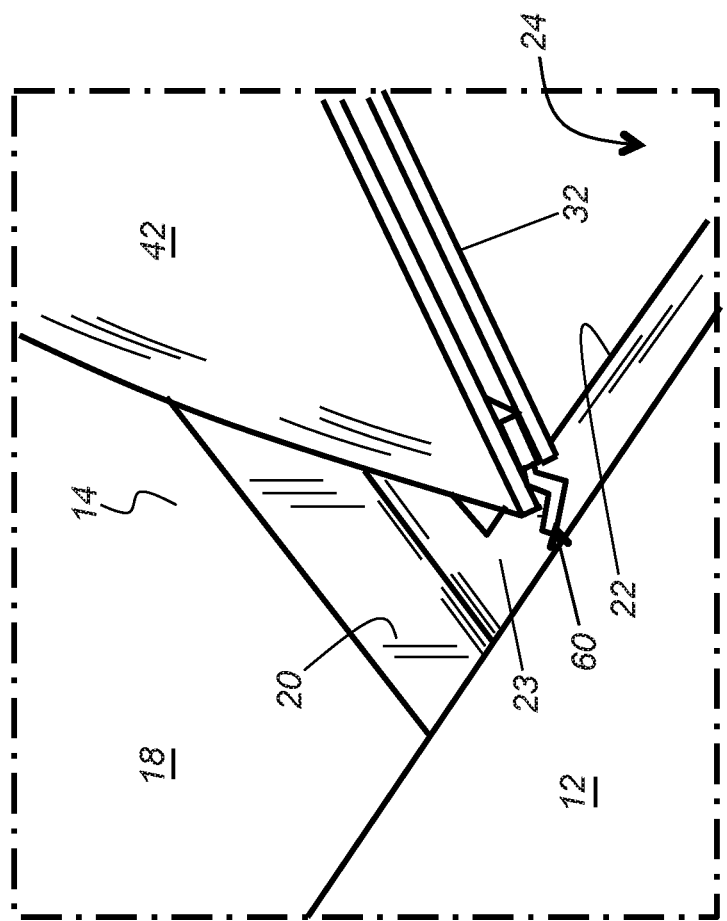
FIG. 3 is a fragmented top view of the vehicle of FIG. 1 at the interface between the roof section and the rear window pane, wherein rear liftgate body and the rear window pane are depicted in the raised or open position.

At the rear of the vehicle 10, the vehicle body 12 defines a rear liftgate opening 22 below and rearward of the rear edge 20 of the roof section 14. As best shown in FIG. 1, the vehicle body 12 includes a first side body pillar 21a and a second side body pillar 21b on opposite sides of the rear liftgate opening 22. As best shown in FIG. 3, the vehicle body 12 may include a ledge inset 23 defining a shoulder surrounding the rear liftgate opening 22. Referring back to FIG. 1, rear brake lights 25a and 25b are shown on opposite sides of the rear liftgate opening 22 rearward of the first and second side body pillars 21a and 21b, respectively.

As best shown in FIG. 1, the interior passenger compartment includes a cargo area 24 behind a rear seat bench upright 26. Front seats 28 and 30 are positioned forward of the rear seat bench upright 26 for accommodating the driver and a passenger, respectively. Other interior passenger compartment features of the vehicle 10, such as a steering wheel, brake pedal, accelerator pedal, clutch (for manual/non-automatic vehicles), shifter, speedometer, odometer, cup holders, etc. are known in the art and not further described herein or illustrated in the drawings.

The vehicle 10 further includes a rear liftgate body 32. Referring to FIG. 1, the rear liftgate body 32 includes a first side frame member 34, a second side frame member 36, a forward frame member 38 connecting the forward ends of the first and second frame members 34 and 36, and a rear frame member (not shown) connecting the rear ends of the first and second frame members 34 and 36 to collectively define a generally rectangular frame. The inner edges of the first and second frame members 34 and 36, the forward frame member 38, and the rear frame member circumscribe a rear window opening 40.

Figure 5:
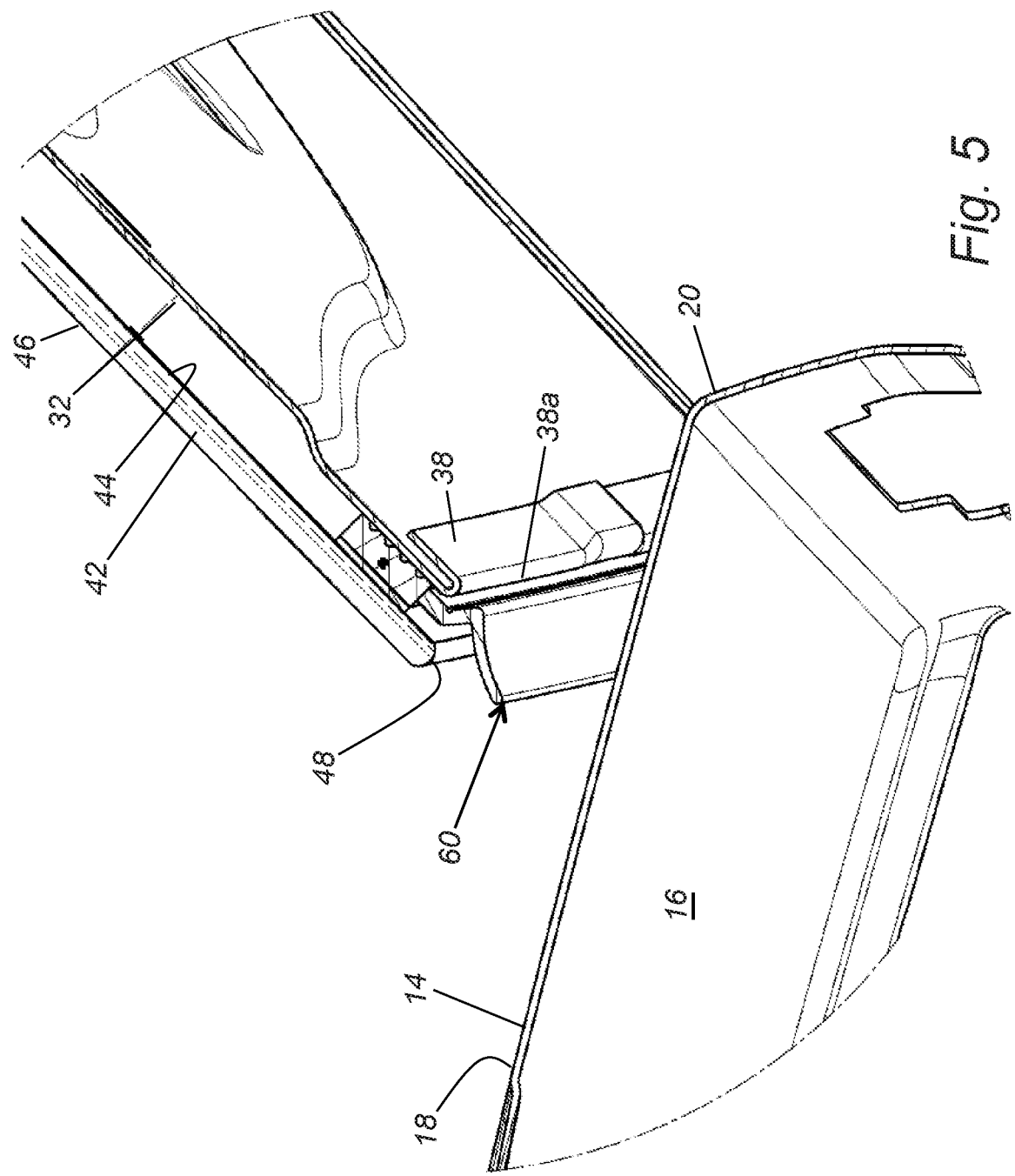
FIG. 5 is a fragmented cutaway view of the vehicle of FIG. 1 depicting the rear liftgate body and the rear window pane in the raised or open position.

A rear window pane (or liftgate window pane) 42 is mounted on the rear liftgate body 32 to cover the rear window opening 40. Preferably, the rear window pane 42 is fixed and non-movable relative to the rear liftgate body 32. As best shown in FIGS. 4 and 5, the rear window pane 42 includes an interior surface 44, an exterior surface 46 opposite to the interior surface 44, and a forward edge 48 extending between the interior and exterior surfaces 44 and 46. The interior and exterior surfaces 44 and 46 may have a convex shape. Further, the interior and exterior surfaces 44 and 46 preferably continuously extend at least to, and optionally beyond, the outer edges of the side frame members 34 and 36, the forward frame member 38, and the rear frame member. For example, FIGS. 4 and 5 show the forward edge 48 of the rear window pane 42 extending at least and beyond a front edge 38a of the forward frame member 38 of the rear liftgate body 32.

Figure 7:
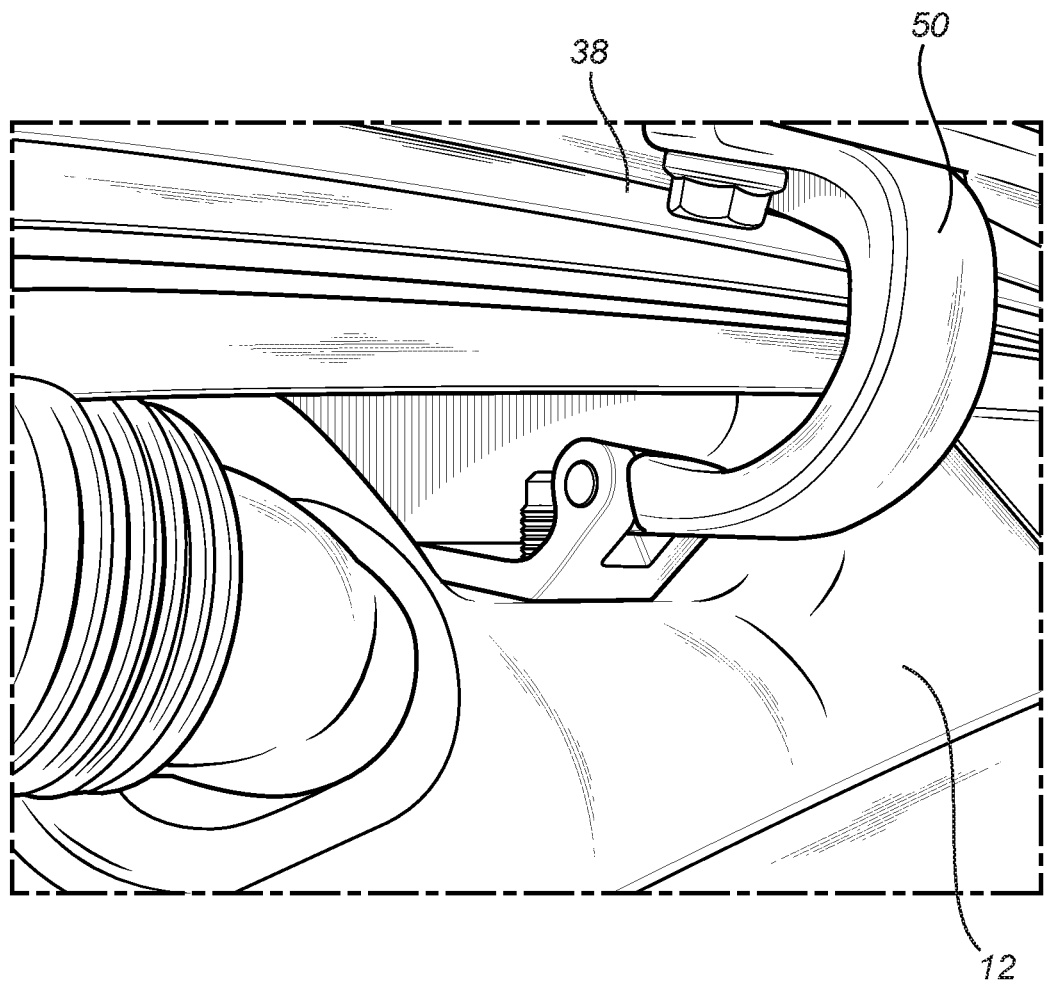
FIG. 7 is a fragmented, enlarged view of an embodiment of a pivot member of the vehicle of FIG. 1.

Referring now to FIGS. 1 and 7, at least one, and preferably two pivot members (also known as hinges) 50 connect the vehicle body 12 to the rear liftgate body 32. The pivot members 50 may be, for example, pivot members known in the art for opening and closing liftgates and rear hatch doors. The pivot members 50 permit downward pivotal movement of the rear liftgate body 32 with the rear window pane 42 into a lowered position shown in FIGS. 2 and 4 in which the rear liftgate opening 22 is closed. The vehicle 10 typically includes a lock (not shown) for maintaining the rear liftgate body 32 in the lowered position.

In the lowered position, the rear liftgate body 32 and the rear window pane 42 block access to the cargo area 24 via the rear liftgate opening 22. However, the cargo area 24 preferably is accessible from the interior passenger compartment, even when the rear liftgate body 32 is in the lowered position. The interior surface 44 of the rear window pane 42 faces the interior passenger compartment of the vehicle body 12 and the exterior surface 46 of the rear window pane 42 faces away from the interior passenger compartment of the vehicle body 12 when in the lowered position. The exterior surface 46 of the rear window pane 42 and the exterior facing roof surface 18 are flush with one another when the rear liftgate body 32 is in the lowered position, as best shown in FIGS. 2 and 4.

The pivot members 50 also permit upward pivotal movement of the rear liftgate body 32 with the rear window pane 42 into a raised position above the roof section 14. In the raised position, the rear liftgate opening 22 is unobstructed and the passenger compartment is accessible through the rear liftgate opening 22. The exterior surface 46 of the rear window pane 42 and the exterior facing roof surface 18 are not flush with one another when the rear liftgate body 32 is in the raised position, as best shown in FIGS. 1, 3, and 5. FIG. 5 shows the forward edge 48 of the rear window pane 42 exposed in the raised position.

Figure 2:
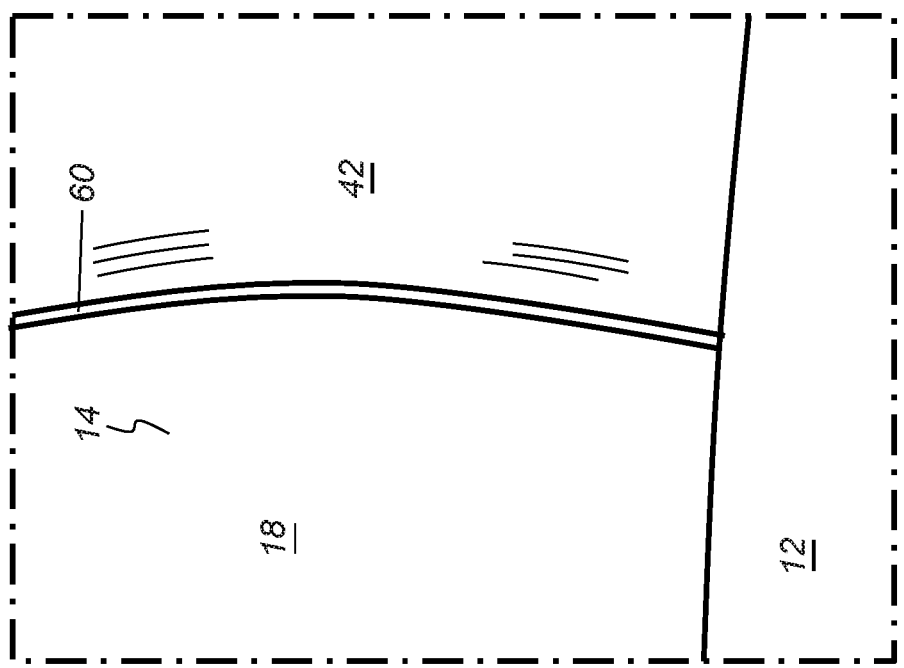
FIG. 2 is a fragmented top view of the vehicle of FIG. 1 at the interface between a roof section and the rear window pane of the vehicle, wherein the rear liftgate body and the rear window pane are depicted in a lowered or closed position.

As best shown in FIGS. 2 and 4, the forward edge 48 of the rear window pane 42 interfaces and is spaced from the rear edge 20 of the roof section 14 by a gap 52 when the rear liftgate body 32 and the rear window pane 42 are in the lowered position. A liftgate seal generally designated by reference numeral 60 is provided for filling and sealing the gap 52 against water penetration.

Figure 6:
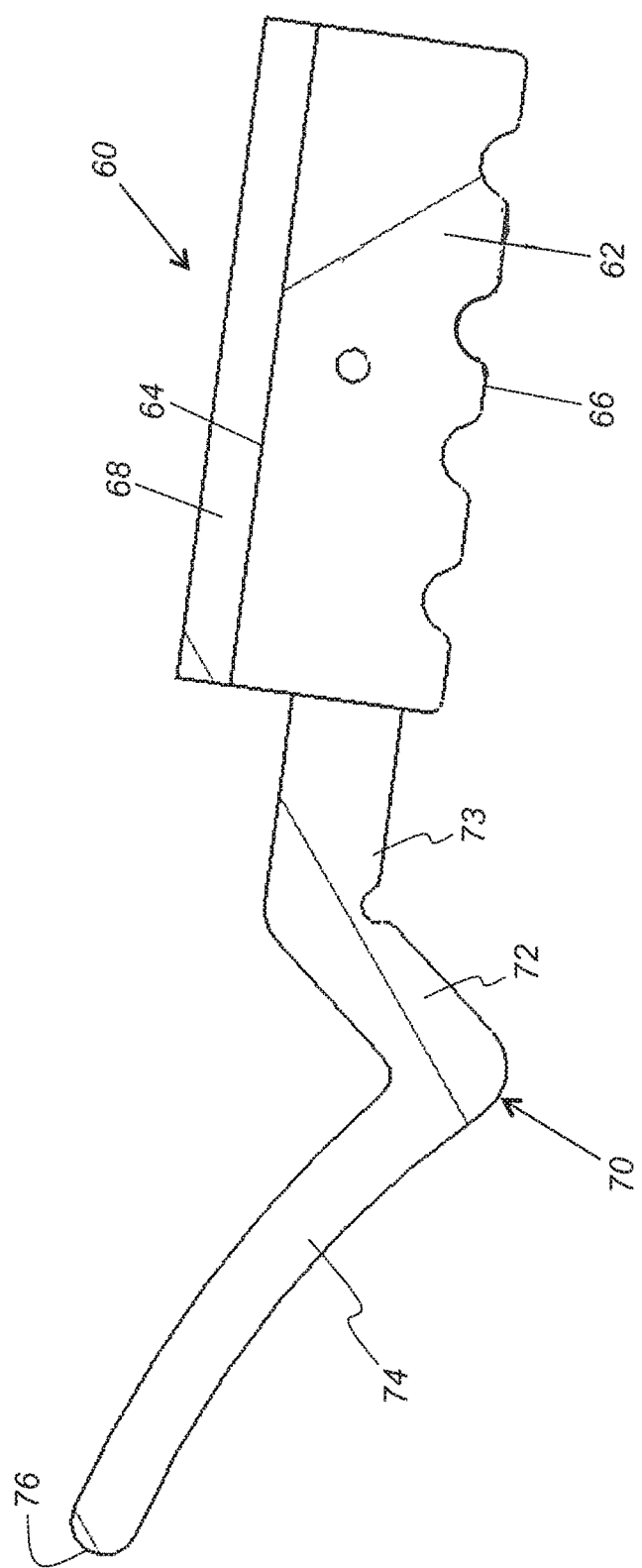
FIG. 6 is an enlarged side sectional view of an exemplary embodiment of a seal of the vehicle of FIG. 1.

As best shown in FIG. 6, according to an exemplary embodiment the seal 60 includes a base wall 62 having an upper surface 64 and an opposite lower surface 66. As best shown in FIGS. 4 and 5, an adhesive, such as a double-sided tape 68, secures the upper surface 64 of the base wall 62 to the interior surface 44 of the rear window pane 42. Alternatively, a mechanical fastener or other device or part may be used to secure the base wall 62 to the rear window pane 42. The lower surface 66 of the base wall 62 preferably abuts the forward frame member 38.

The seal 60 further includes a channel structure (or flange) 70, which may be integrally formed with or otherwise attached to the base wall 62. The channel structure 70 includes a first wall 72 connected to the base wall 62 by a stem portion 73, and a second wall 74 angled relative to the first wall 72. The first and second angled walls 72 and 74 collectively define a channel, which is illustrated as having a "V" shape, configured to receive any water (such as rainwater or water from melted snow) falling on the motor vehicle 10 and passing through the gap 52.

The second wall 74 includes a distal end 76. As best shown in FIG. 4, the distal end 76 of the second wall 74 is in contact with the rear edge 20 of the roof section 14 when the rear liftgate body 32 and the rear window pane 42 are in the lowered position. Preferably, the seal 60 is the only structure in the gap 52 between the forward edge 48 of the rear window pane 42 and the rear edge 20 of the roof section 14 when the rear liftgate body 32 and the rear window pane 42 are in the lowered position. For example, the rear liftgate body 32, including the forward frame member 38, is outside of the gap 52 at the interface of the rear window pane 42 and the roof section 14.

The seal 60 may be made of, for example, an elastomeric material, such as an ethylene-propylene-diene-monomer (EPDM) polymer. According to an exemplary embodiment, the base wall 62 is made of a first EPDM polymer, and the first and second angled walls 72 and 74 of the channel structure 76 are made of a second EPDM polymer having a lower density than the first EPDM polymer. The lower density EPDM provides the channel structure 76 with great flexibility for sealing the gap 52 and conforming to the rear edge 20 of the roof section 14 when the rear liftgate body 32 and the rear window pane 42 are in the lowered position.

The seal 60 may be installed, for example, by adhering the upper surface 64 of the base wall 62 to the interior surface 44 of the rear window pane 42 using the adhesive 68 before the rear window pane 42 is connected (and preferably fixed) to the rear liftgate body 32.

Note that not all of the steps described above in the general description or the examples are required, that a portion of a specific step may not be required, and that one or more further steps may be performed in addition to those described. Still further, the order in which steps are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any sub combination.

What is claimed is:

1. A liftgate seal for a vehicle including a vehicle roof and a vehicle liftgate having a liftgate window pane, the liftgate seal comprising a base wall secured to an interior facing surface of the liftgate window pane and a channel structure comprising a first wall connected to the base wall and a second wall angled relative to the first wall, the second wall comprising a distal end in contact with a rear edge of the vehicle roof when the vehicle liftgate is in a closed position thereby sealing a gap between the rear edge of the vehicle roof and liftgate window pane.

2. The liftgate seal of claim 1, wherein the liftgate window pane has an exterior window surface and the vehicle roof has an exterior roof surface that are flush with one another with the gap therebetween when the vehicle liftgate is in the closed position, and wherein the second wall extends into the gap.

3. The liftgate seal of claim 1, wherein the base wall of the liftgate seal comprises an upper surface adapted to be adhesively secured to the liftgate window pane and an opposite lower surface.

4. The liftgate seal of claim 3, wherein the opposite lower surface abuts against a forward frame member of the vehicle liftgate.

5. The liftgate seal of claim 1, wherein the liftgate seal is the only structure between a forward edge of the liftgate window pane and the rear edge of the vehicle roof when the vehicle liftgate is in the closed position.

6. The liftgate seal of claim 1, wherein the liftgate seal comprises an elastomer.

7. The liftgate seal of claim 6, wherein the base wall comprises a first elastomer, the first and second angled walls of the channel structure comprise a second elastomer, and the first elastomer has a higher density than the second elastomer.

8. The liftgate seal of claim 1, wherein the first and second walls of the channel structure collectively define a V-shape.

9. The liftgate seal of claim 1, further comprising a stem portion connecting the base wall to the channel structure.

10. A liftgate seal for a vehicle including a vehicle roof and a vehicle liftgate having a liftgate window pane, the liftgate seal comprising a base wall configured to be secured to an interior facing surface of the liftgate window pane and a channel structure comprising a first wall connected to the base wall and a second wall angled relative to the first wall, the second wall comprising a distal end configured to be in contact with a rear edge of the vehicle roof when the vehicle liftgate is in a closed position thereby sealing a gap between the rear edge of the vehicle roof and liftgate window pane, wherein the channel structure has a lower density than the base wall.

11. The liftgate seal of claim 10, wherein the liftgate window pane has an exterior window surface and the vehicle roof has an exterior roof surface that are flush with one another with the gap therebetween when the vehicle liftgate is in the closed position, and wherein the second wall is adapted to extend into the gap.

12. The liftgate seal of claim 10, wherein the base wall of the liftgate seal comprises an upper surface adapted to be adhesively secured to the liftgate window pane and an opposite lower surface.

13. The liftgate seal of claim 12, wherein the opposite lower surface is adapted to abut against a forward frame member of the vehicle liftgate.

14. The liftgate seal of claim 10, wherein the first and second walls of the channel structure collectively define a V-shape.

15. The liftgate seal of claim 10, further comprising a stem portion connecting the base wall to the channel structure.

16. The liftgate seal of claim 10, wherein the liftgate seal is the only structure between a forward edge of the liftgate window pane and the rear edge of the vehicle roof when the rear liftgate is in the closed position.

17. A vehicle, comprising:
    a vehicle body comprising a passenger compartment, a liftgate opening, and a vehicle roof including an exterior roof surface and a rear edge;
    a vehicle liftgate comprising
        a liftgate body having a window opening; and
        a liftgate window pane mounted on the liftgate body to extend over the window opening, the liftgate window pane comprising an interior facing surface, an exterior facing surface opposite to the interior facing surface, and a forward edge;
    at least one pivot member pivotally connecting the vehicle body to the liftgate body to permit downward pivotal movement of the vehicle liftgate into a lowered position in which the liftgate opening is closed and upward pivotal movement of the vehicle liftgate into a raised position in which the liftgate opening is open, the forward edge of the liftgate window pane facing the rear edge of the vehicle roof when the vehicle liftgate is in the lowered position; and
    a liftgate seal comprising a base wall secured to the interior surface of the rear window pane and a channel structure, the channel structure comprising a first wall connected to the base wall and a second wall angled relative to the first wall, the second wall comprising a distal end in contact with the rear edge of the vehicle roof when the vehicle liftgate is in the lowered position.

18. The vehicle of claim 17, wherein the exterior surface of the liftgate window pane and the exterior roof surface are flush with one another when the rear liftgate is in the lowered position.

19. The vehicle of claim 17, wherein the vehicle rear liftgate seal is the only structure between the forward edge of the rear window pane and the rear edge of the roof section when the rear liftgate is in the lowered position.

20. The vehicle of claim 17, wherein the first and second walls of the channel structure collectively define a V-shape.

* * * * *